United States Patent [19]
Lewin et al.

[11] Patent Number: 6,032,218
[45] Date of Patent: Feb. 29, 2000

[54] CONFIGURABLE WEIGHTED ROUND ROBIN ARBITER

[75] Inventors: Amit Lewin, Tel-Aviv; Tal Keren Zvi, Rosh Ha'ayin, both of Israel

[73] Assignee: 3Com Corporation, Santa Clara, Calif.

[21] Appl. No.: 09/086,241

[22] Filed: May 28, 1998

[51] Int. Cl.[7] .............................. G06F 13/18; H04L 12/00
[52] U.S. Cl. ........................... 710/240; 710/111; 710/243
[58] Field of Search .................................. 710/240, 111, 710/107, 112, 113, 116, 241, 243; 370/414, 351, 462, 395, 905

[56] References Cited

U.S. PATENT DOCUMENTS

| | | | |
|---|---|---|---|
| 5,481,680 | 1/1996 | Larson et al. | 710/112 |
| 5,483,536 | 1/1996 | Gunji et al. | 370/85.14 |
| 5,550,818 | 8/1996 | Brackett et al. | 370/60 |
| 5,566,014 | 10/1996 | Glance | 359/124 |
| 5,726,985 | 3/1998 | Daniel et al. | 370/382 |
| 5,784,374 | 7/1998 | Runaldue | 370/414 |

OTHER PUBLICATIONS

Perlman, R., "Interconnections: Bridges and Routers", Addison–Wesley Publishing, Section 9.2.4, Chapter 9, pp. 205–264 (1992).

Sedgewick, R., "Algorithms", Second Edition, Addison–Wesley Publishing, Chapter 17, pp. 245–257 (1988).

Doeringer, W. et al., "Routing on Longest–Matching Prefixes", *IEEE/ACM Transactions on Networking*, vol. 4, No. 1, Feb. 1996, pp. 86–97.

Williams, K. A., "A Distributed ATM Network Based on an Optical Passive Star", printed from website http://williams.cs.ncat.edu/ATMStar.htm, 2 pages, (1998).

"All–optical ATM–Switch based on Self Electro–optic Effect Devices (SEED's)", printed from website http://www.stw.nl/projecten/T/tel3997.html, 2 pages, Feb. 2, 1997.

*Primary Examiner*—Gopal C. Ray
*Attorney, Agent, or Firm*—David J. Weitz; Wilson Sonsini Goodrich & Rosati

[57] ABSTRACT

A configurable weighted round robin arbitration mechanism adapted to receive as input a vector of order N, wherein each bit in the vector represents the eligibility of a queue or other source of data to participate in the arbitration process. A bit set to '1' in the vector indicates that the corresponding queue is eligible to participate in the arbitration process. Conversely, a bit set to '0' in the vector indicates that the corresponding queue is not eligible to participate. The arbitration process of the present invention enables a user to assign each queue (which corresponds to one of the bits in the vector) an individual weight. This results in a modified vector that represents the incoming vector after being handled by the weighting process. By giving each bit in the vector a weight, the user can control the probability of each bit, i.e., queue, being selected in the arbitration process.

12 Claims, 2 Drawing Sheets

CONFIGURABLE WEIGHTED ROUND ROBIN ARBITER

FIELD OF THE INVENTION

The present invention relates generally to data communications equipment and more particularly relates to a configurable weighted round robin arbiter.

BACKGROUND OF THE INVENTION

More and more reliance is being placed on data communication networks to carry increasing amounts of data. In a data communications network, data is transmitted from end to end in groups of bits which are called packets, frames, cells, messages, etc. depending on the type of data communication network. For example, Ethernet networks transport frames, X.25 and TCP/IP networks transport packets and ATM networks transport cells. Regardless of what the data unit is called, each data unit is defined as part of the complete message that the higher level software application desires to send from a source to a destination. Alternatively, the application may wish to send the data unit to multiple destinations.

Asynchronous Transfer Mode

ATM originated as a telecommunication concept defined by the Comite Consulatif International Telegraphique et Telephonique (CCIT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

More information on ATM networks can be found in the book "ATM: The New Paradigm for Internet, Intranet and Residential Broadband Services and Applications," Timothy Kwok, Prentice Hall, 1998.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

Queue Handling

A Typical ATM switch comprises a plurality of port interface cards coupled to the ingress of a switching fabric. The egress of the switch is also coupled to a port interface card. The functions of the interface card includes translation from optical signal to electrical, performing error checking on the received cells, etc. The interface card also comprises a cell processor one of whose major functions is to determine the appropriate output destination port for each incoming cell. The cell processor makes this determination based on the destination ATM address in the received cell and on the contents of a lookup table (LUT). The LUT comprises destination entries for all possible VPI/VCI combinations.

The entry retrieved from the LUT is used to generate a routing tag for the cell. The cell is the passed to the switching fabric which functions to steer the cell to the appropriate destination. Note that for a unicast cell, the routing tag has only a single destination port selected. For a multicast (MC) cell, however, the routing tag may have a plurality of destination ports indicated.

One of the functions of the cell processor at the ingress is to provide an arbitration function for all the queues vying for the switch resources. A common arbitration scheme is to simply move from queue to queue in round robin fashion, skipping over queues that do not have data to transmit.

It is desirable, however, to sometimes give certain queues higher priority over other queues. In other words, some queues are emphasized more and are permitted to transmit data more frequently than other queues that are emphasized less. In some applications, some queues in the switch are more significant than others and it is preferable that they do not wait too long to transmit data. For example, it may be desirable to favor multicast queues over unicast queues since a cell in the multicast queue contains data destined to potentially many output ports at one time.

In addition, if for example the switching fabric is divided into multiple portions wherein cells can be destined to any of the portion independently, a multicast cell with destinations that overlap switch portions requires the cell to remain in the queue until the cell is written to all the portions. If the arbiter mechanism chooses cells for input to the switch fabric independently across all switch portions, then it is highly probable that the multicast queue will be chosen for all switch portions during the same cycle.

In this case, the multicast cell must remain at the head of its queue even though the multicast cell has already been input to one or more switch fabric portions. This causes delays for the cells waiting in the queue behind the cell at the head. These cells must wait for the arbiter to choose them again so they can input the cell to the remaining switch portions. Thus, it is preferable to give preference to multicast cells in order to speed their processing through the switch.

For example, suppose a switch comprises two switch fabric portions and 20 output ports. Assuming a round robin arbitration scheme, the probability of the arbiter choosing any one queue is 0.05. If a multicast cell is to be output to ports on both switch portions, then the arbiter must choose that multicast queue twice; once for each switch portion. The arbitration decision for each switch portion is made independently of one another. The probability of the arbiter choosing the same multicast queue for both switch portions during the same cycle is then 0.0025, a relatively low probability. Thus, the cell must remain in the queue until the second arbiter chooses that multicast queue again. This introduces time delays, lowers the throughput of the switch and underutilizes the resources of the switch.

SUMMARY OF THE INVENTION

The present invention is a configurable weighted round robin arbitration mechanism. The arbitration mechanism receives as input a vector of order N, wherein each bit in the vector represents the eligibility of a queue or other source of data to participate in the arbitration process. A bit set to '1' in the vector indicates that the corresponding queue is eligible to participate in the arbitration process. Conversely, a bit set to '0' in the vector indicates that the corresponding queue is not eligible to participate.

The arbitration process of the present invention enables a user to assign each queue (which corresponds to one of the bits in the vector) an individual weight. This results in a modified vector that represents the incoming vector after being handled by the weighting process. By giving each bit in the vector a weight, the user can control the probability of each bit, i.e., queue, being selected in the arbitration process.

One application of the arbitration apparatus of the present invention, is in a switch that comprises an ingress portion and an egress portion. The ingress portion comprises a plurality of queues each containing zero or more data units, e.g., cells, frames, etc. During each cell time (in the case of ATM switching, frame time in the case of Ethernet), a single queue is selected by the arbiter to release a waiting cell. The present invention permits the probability of certain queues to be selected by the arbiter to be increased or decreased over other queues that also have cells waiting.

Throughout this document the term item(s) refers to the entities among which the arbitration process takes place. Examples of items include queues, servers or any other source of data. The eligibility vector is a bitmap vector that is stored in an eligibility register. The eligibility vector is a bitmap vector wherein each bit represents a single item. When an item is eligible to participate in the arbitration process, its corresponding bit is set to '1' or set to '0' if the item is not eligible to participate in the arbitration process. The value N represents the number of items. The value N also is the size of the dimension of the eligibility vector.

There is provided in accordance with the present invention an arbiter for arbitrating among a plurality of items comprising a first register having a length N, the first register for storing a first bitmap vector corresponding to the eligibility of an item to participate in an arbitration process, a weight table having K rows and N columns, wherein each column represents a weight associated with one of the bits in the first bitmap vector, eligibility circuitry for applying the weights within the weight table to the bits within the first bitmap vector to yield a weighted eligibility table having K rows and N columns, the eligibility circuitry adapted to generate a plurality of indications wherein each indication is associated with a row in the weighted eligibility table and indicates whether the row is empty or non empty, arbitration circuitry for applying a first arbitration process among the plurality of indications to yield a selected bit, the arbitration circuitry for choosing a row within the weighted eligibility table with which to perform a second arbitration process and wherein K and N are positive integers.

The apparatus further comprises a third register having length N for storing the row from the weighted eligibility table chosen by the arbitration circuitry and upon which the second arbitration process is performed. The third register comprises an item register and the first register comprises an eligibility register for holding the contents of the first bitmap vector.

The apparatus further comprises a second register having a length K for storing the plurality of indications generated by the eligibility circuitry. The second register comprises a result register.

The apparatus further comprises a host application for configuring the weight table wherein the weight table is adapted to be configured by a host application with one or more weights. In addition, a greater number of bits making up the value K results in a correspondingly higher granularity of the weights applied to each bit within the first bitmap vector. Also, a larger number of bits set in any one column of the weight table results in a higher probability of the corresponding bit in the first bitmap vector of being selected in the second arbitration process.

The first arbitration process comprises a round robin technique. The second arbitration process comprises a round robin technique.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout
The following notation is used throughout this document

| Term | Definition |
|---|---|
| ANSI | American National Standards Institute |
| ATM | Asynchronous Transfer Mode |
| CCITT | Comite Consulatif International Telegraphique et Telephonique |
| FDDI | Fiber Distributed Data Interface |
| IP | Internet Protocol |
| ITU | International Telecommunications Union |
| LUT | Lookup Table |
| MC | Multicast |
| TCP | Transmission Control Protocol |
| UNI | User to Network Interface |
| VCI | Virtual Circuit Indicator |
| VPI | Virtual Path Indicator |

General Description

Figure 1:
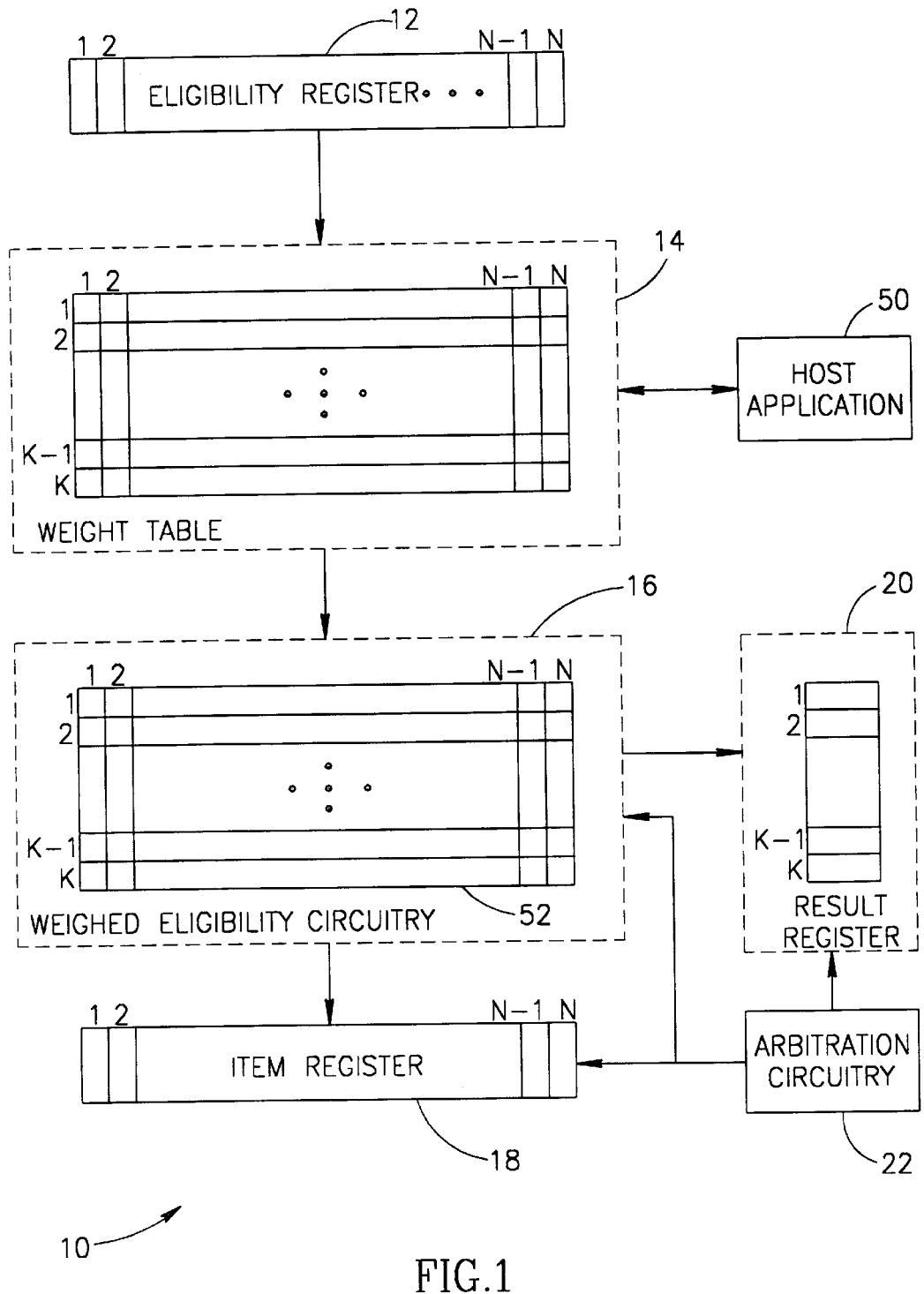
FIG. 1 is a block diagram illustrating a weighted round robin arbiter constructed in accordance with the present invention.

The present invention is a configurable weighted round robin arbiter that implements a weighted arbitration scheme among a plurality of items, thus permitting some items to have different probabilities or odds of being selected. A block diagram illustrating a weighted round robin arbiter constructed in accordance with the present invention is shown in FIG. 1. To implement a weighted arbitration scheme, a weight table 14 (item weight array( is utilized. The arbiter, generally referenced 10, comprises an eligibility register 12, a weight table 14, a weighted eligibility circuit 16, item register 18, result register 20 and arbitration circuitry 22. In addition a host application 50 interfaces to the weight table.

The eligibility register 12 has a length N and is used to store the eligibility vector. The weight table 14 comprises a register file having dimensions K×N (K rows by N columns) and is used to store the item weight array. The weighted eligibility circuit 16 comprises a weighted eligibility table 52 and logic circuitry (not shown) that is used in determining which item is to be selected by the arbiter. The weighted eligibility table 52 comprises the same dimensions K×N as the weight table 14.

The result register 20 has a length K and is used to store the results of the weighted eligibility circuit 16. The arbitration circuitry 22 is coupled to both the weighted eligibility circuit 16 and the item register 18. The item register 18 has a length N and functions to store one of the K rows of the weighted eligibility table 52.

Note that the number K is user defined and represents the resolution of the weights that can be assigned to each item. The higher the number K gets, the higher the granularity and the higher the number of different combinations of the weights that can be assigned. Each column of the weight table 14 represents a weight assigned to a single item that participates in the arbitration process.

It is important to note that if a column in the weight table 14 contains all zeros, the corresponding item has a weight of zero and hence, a probability of zero of being selected by the arbiter. In addition, the columns represent the weight of each item. Up to 'K' ones can be set for any one column corresponding to an item. Any combination of bits is permitted. The greater the number of ones set in a column, the greater the probability for the item to be selected by the arbitration circuitry 22. Thus, some items can be emphasized more than others creating a weighted distribution of 'ones' among all the items.

Note that the contents of the weight table 14 are configurable by a host application 50 or any other suitable control means. Typically, the contents of the weight table change less frequently then the contents of the eligibility register (vector) 12. The bits of the eligibility register are changing more dynamically as queues are filled and become empty on a relatively more frequent basis.

Once the weight table 14 is initialized with individual item weights via the host application 50, the arbitration process can begin. The process begins with the generation of a new weighted eligibility table 52 of dimension K columns by N rows. Each column represents the weight for one of N items. Each bit in the weighted eligibility table 52 is generated by performing a logical AND operation between a bit n the eligibility register and each bit in a corresponding column of the weight table 14, as given below.

$$\text{weighted\_eligib\_table}(i,j) = \text{weight\_table}(i,j) \text{ AND eligib\_vector}(i) \quad (1)$$

wherein 'i' is the column index ranging from 1 to N and 'j' is the row index ranging from 1 to K.

The resultant array, i.e., the weighted eligibility table 52 also comprises K rows wherein each row is denoted a group. In the weighted eligibility table 52 a column contains all zeros if the corresponding bit in the eligibility register is set to a '0'. If the bit in the eligibility register 12 is set to a '1', then the corresponding column in the weighted eligibility table 52 will contain the contents of the corresponding column in the weight table 14.

The next step is to select one group out of the K groups (rows) to be used for the actual round robin arbitration process. This selection process will now be described in more detail. The first step is to logically OR together all the bits in each row of the weighted eligibility table 52 to yield a single result bit for each row. Since there are K rows, K result bits are generated. The K result bits are stored in the result register 20. As described previously, the more bits that are set to '1' in a column of the weight table, the higher the probability that the corresponding bit in the selected group will be represented.

In order to select a group, i.e., row, from the weighted eligibility table 52, it is preferable to eliminate from consideration the groups that are 'empty', i.e., contain all zeros. This is achieved by performing a logical OR of all the bits in a group. Thus, a group with at least one bit set yields a '1' (non empty group) and a group with no bits set yields a '0' (empty group).

The result of the logical OR operation is a vector or order K corresponding to each of the groups in the weighted eligibility table. The results vector is stored in the result register 20, with one bit associated with each group (row). In the next step, one of the groups is selected from among the bits set to '1' in the results register 20. The bit is selected via an arbitration process performed by the arbitration circuitry 22. Only those bits set to '1', i.e., representing non empty groups, are considered by the arbitration circuitry. The arbitration process performed on the results register is a round robin procedure. The round robin process begins from the group following the group that was last selected in the previous arbitration cycle.

Therefore, the last bit used is stored and used in performing the subsequent arbitration cycle. In the next cycle, the round robin arbitration process begins with the bit following the bit used in the previous cycle. After the arbitration process has completed, the bit that was selected by the arbiter points to the selected group. This selected group, the weighted group, is then read from the weighted eligibility table 52 and written to the item register 18. In the last step of the process, the arbitration circuitry then arbitrates in round robin fashion among the bits that are set to '1' in the item register 18.

As with the results register, the arbitration circuitry selects the item at the first non zero bit following the last selected item. The last selected item is the bit that was selected in the previous cycle and therefore should be stored.

In the example of a switch, the item register holds the item vector that is used to determine the order in which the queues are selected to transmit data to the switch fabric.

Figure 2:
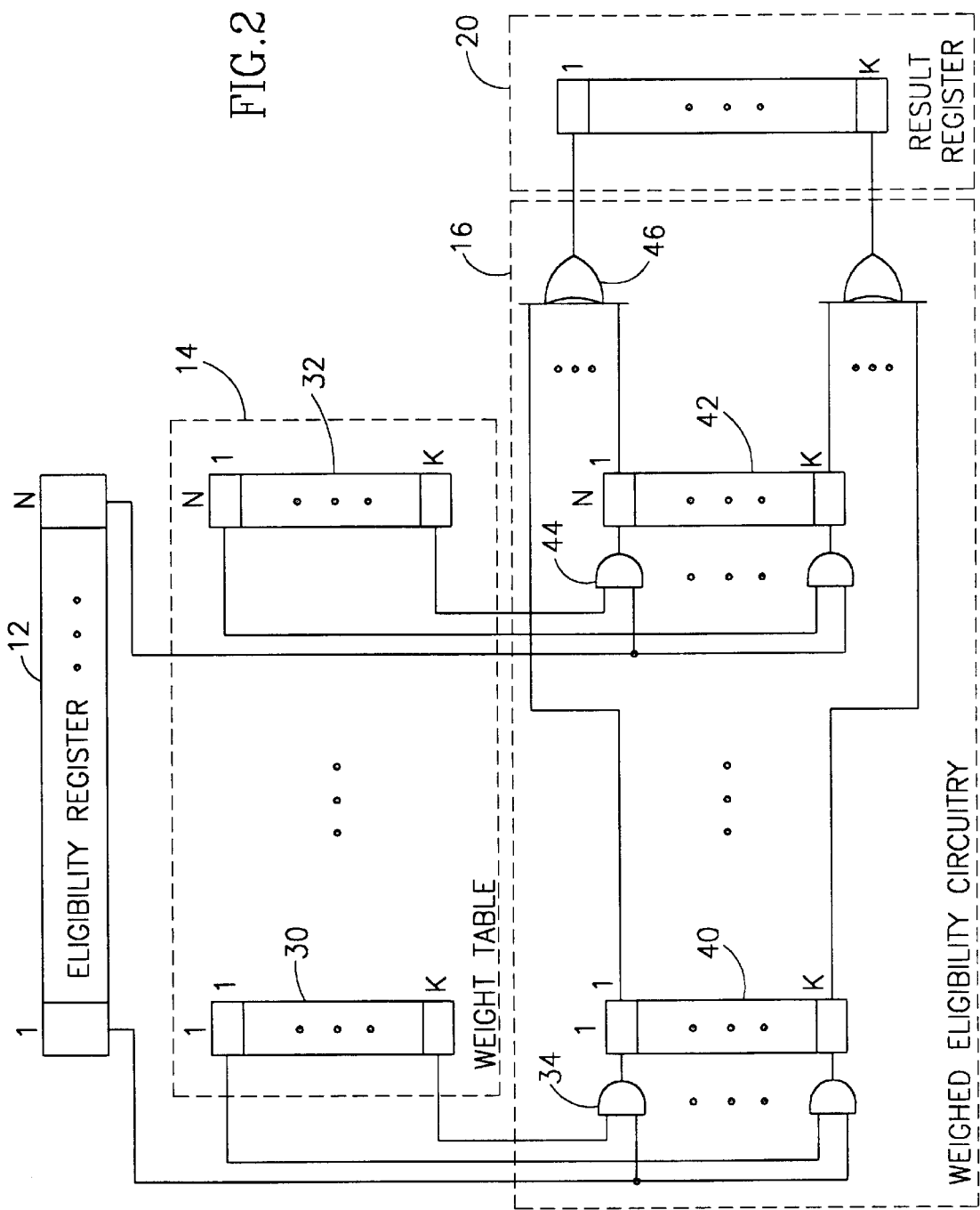
FIG. 2 is a block diagram illustrating the weight table and weighted eligibility circuitry portions of the arbiter in more detail.

A block diagram illustrating the weight table and weighted eligibility circuitry portions of the arbiter in more detail is shown in FIG. 2. As described hereinabove, the contents of the weighted eligibility table is generated by the logical AND of the contents of the eligibility register 12 and the weight table 14. A logical AND is performed between each $i^{th}$ but in the eligibility register 14 and each of K bits in the corresponding $i^{th}$ column of the weight table 14. For example, AND gates 34 are used to generate the product bits for column 1 (referenced 40) from bit 1 of the eligibility register and column 1 (referenced 30) of the weight table. Similarly, AND gates 44 are used to generate the product bits for column N (referenced 42) from bit N of the eligibility register and column N (referenced 32) of the weight table.

The bits of the result register 20 are generated by a logical OR of the bits within each group of the weighted eligibility table via OR gates 46. For example, bit 1 of the result register is generated from the logical OR of bit 1 from column 1, but 1 from column 2, etc. through bit 1 of column N. All the bit 1s are input to OR gate 46 to generate bit 1 of the result register. Bits 2 through K of the result register are generated in a similar manner as bit 1.

While the invention has been described with respect to a limited number of embodiments, it will be appreciated that many variations, modifications and other applications of the invention may be made.

What is claimed is:

1. An arbiter for arbiting among a plurality of items, comprising:

a first register having a length N, said first register for storing a first bitmap vector corresponding to the eligibility of an item to participate in an arbitration process;

a weight table having K rows and N columns, wherein each column represents a weight associated with one of the bits in said first bitmap vector;

eligibility circuitry for applying the weights within said weight table to the bits within said first bitmap vector to yield a weighted eligibility table having K rows and N columns, said eligibility circuitry adapted to generate a plurality of indications wherein each indication is associated with a row in said weighted eligibility table and indicates whether said row is empty or non empty;

arbitration circuitry for applying a first arbitration process among said plurality of indications to yield a selected bit, said arbitration circuitry for choosing a row within said weighted eligibility table with which to perform a second arbitration process; and wherein K and N are positive integers.

2. The apparatus according to claim 1, further comprising a third register having length N for storing the row from said weighted eligibility table chosen by said arbitration circuitry and upon which said second arbitration process is performed.

3. The apparatus according to claim 2, wherein said third register comprises an item register.

4. The apparatus according to claim 1, wherein said first register comprises an eligibility register for holding the contents of said first bitmap vector.

5. The apparatus according to claim 1, further comprising a second register having a length K for storing said plurality of indications generated by said eligibility circuitry.

6. The apparatus according to claim 5, wherein said second register comprises a result register.

7. The apparatus according to claim 1, further comprising a host application for configuring said weight table.

8. The apparatus according to claim 1, wherein said weight table is adapted to be configured by a host application with one or more weights.

9. The apparatus according to claim 1, wherein a greater number of bits making up the value K results in a correspondingly higher granularity of the weights applied to each bit within said first bitmap vector.

10. The apparatus according to claim 1, wherein a larger number of bits set in any one column of said weight table results in a higher probability of the corresponding bit in said first bitmap vector of being selected in said second arbitration process.

11. The apparatus according to claim 1, wherein said first arbitration process comprises a round robin technique.

12. The apparatus according to claim 1, wherein said second arbitration process comprises a round robin technique.

* * * * *